United States Patent [19]
Shigyo et al.

[11] Patent Number: 5,077,768
[45] Date of Patent: Dec. 31, 1991

[54] FAULT DETECTION AND RECOVERY DEVICE USED IN A RADIATION IMAGING INFORMATION PROCESSING SYSTEM

[75] Inventors: Masao Shigyo; Kunimasa Shimizu, both of Ashigarakami, Japan

[73] Assignee: Fuji Photo Film Co., Ltd., Kanagawa, Japan

[21] Appl. No.: 481,273

[22] Filed: Feb. 20, 1990

[30] Foreign Application Priority Data

Feb. 20, 1989 [JP] Japan .................................. 1-39982
Feb. 28, 1989 [JP] Japan .................................. 1-49246
Mar. 6, 1989 [JP] Japan .................................. 1-54246

[51] Int. Cl.⁵ .............................................. H05G 1/64
[52] U.S. Cl. ........................................ 378/98; 378/62; 378/901; 364/224.5; 364/413.13; 371/7
[58] Field of Search ............ 364/800, 200, 187, 224.5, 364/413.13; 371/7, 4, 9.1, 16.5, 21.2, 29.1; 378/62, 98, 901

[56] References Cited

U.S. PATENT DOCUMENTS

| | | | |
|---|---|---|---|
| 4,030,072 | 6/1977 | Bjornsson | 364/200 |
| 4,133,477 | 1/1979 | Marino et al. | 364/900 |
| 4,305,125 | 12/1981 | Sato et al. | 364/200 |
| 4,377,000 | 3/1983 | Staab | 364/187 |
| 4,453,210 | 6/1984 | Suzuki et al. | 371/4 |
| 4,514,846 | 4/1985 | Federico et al. | 371/29.1 |
| 4,710,946 | 12/1987 | Hinch et al. | 378/62 |
| 4,740,969 | 4/1988 | Fremont | 371/29.1 |
| 4,852,137 | 7/1989 | Mackay | 378/62 |
| 4,912,711 | 3/1990 | Shiramizu | 371/29.1 |
| 4,924,487 | 5/1990 | Nishiki | 378/62 |

FOREIGN PATENT DOCUMENTS

| | | |
|---|---|---|
| 12429 | 1/1980 | Japan . |
| 87970 | 7/1980 | Japan . |
| 103472 | 8/1980 | Japan . |
| 116340 | 9/1980 | Japan . |

Primary Examiner—Janice A. Howell
Assistant Examiner—Kim-Kwok Chu
Attorney, Agent, or Firm—Sughrue, Mion, Zinn, Macpeak & Seas

[57] ABSTRACT

A radiation image information processing system processes a radiation-transmission image, such as an X-ray image of a human body, into an image signal, and records or displays the image signal as a visible image. When a fault occurs in the radiation image information processing system during operation thereof, a support device is connected to a control device of the system. The fault is detected by the support device, which generates a fault detection signal. An address in the image data processing program which is executed by the CPU of the control device is stored in the support device in response to the fault detection signal. The support device can also be used when a function of the system is to be altered or a new function is to be added to the system.

7 Claims, 4 Drawing Sheets

FAULT DETECTION AND RECOVERY DEVICE USED IN A RADIATION IMAGING INFORMATION PROCESSING SYSTEM

BACKGROUND OF THE INVENTION

The present invention relates to a support device for use with a radiation image information processing system, and more particularly to a support device which will be connected to a radiation image information processing system which reads radiation image information from a stimulable phosphor sheet, for example, processes the radiation image information, and records the processed radiation image information on a photographic film or the like or displays the processed radiation image information on a CRT.

There have recently been developed radiation image recording and reproducing systems for producing the radiation-transmitted image of an object using a stimulable phosphor material capable of emitting light upon exposure to stimulating rays (see, for example, Japanese Laid-Open Patent Publications Nos. 55-12429, 55-103472, 55-116340, 55-87970, etc). These radiation image recording and reproducing systems are finding wider use particularly in the medical field. When a certain phosphor is exposed to a radiation such as X-rays, α-rays, β-rays, γ-rays, cathode rays, or ultraviolet rays, the phosphor stores a part of the energy of the radiation. When the phosphor exposed to the radiation is subsequently exposed to stimulating rays such as visible light, the phosphor emits light in proportion to the stored energy of the radiation. The phosphor exhibiting such a property is referred to as a "stimulable phosphor".

In the radiation image recording and reproducing system employing such a stimulable phosphor, the radiation image information of an object such as a human body is stored in a sheet having a layer of stimulable phosphor, and then the stimulable phosphor sheet is scanned with stimulating rays such as a laser beam, so that the stimulable phosphor sheet emits light representative of the radiation image. The emitted light is then photoelectrically detected to produce an image information signal that is electrically processed for generating image information which is recorded as a visible image on a recording medium such as a photographic photosensitive material or displayed as a visible image on a CRT or the like.

In order for the radiation image recording and reproducing system to operate smoothly and efficiently, it should be associated with a well developed support structure.

According to the conventional support structure, when a fault occurs in the radiation image recording and reproducing system, a serviceman inspects the system, and repairs the defective device on site if possible. If the defective device cannot be repaired on site, then it is replaced with a new device.

One problem with the earlier radiation image recording and reproducing systems is that when the system fails for some reasons, chronological data regarding the system failure tend to be lost or insufficient. More specifically, the user of the radiation image recording and reproducing system switches off the system when the system fails, and thereafter switches on the system to restore the system to its normal condition. When the radiation image recording and reproducing system is turned off, however, its memory or hardware is reset and any data relative to the system fault are erased. It therefore becomes difficult or even impossible to analyze the cause of the fault or recover the data with respect to the system fault. As a result, the user cannot find what caused the system fault.

When a certain function of the radiation image recording and reproducing system is to be altered, the prior program for controlling the system is replaced with a program for function alteration, and the newly programmed system is tested in the user's place.

Generally, the medical organizations which are equipped with the radiation image recording and reproducing systems use the systems under different conditions, and have a wide variety of different demands for system functions. Therefore, many function alteration programs are required to meet the user's demands. The development of such function alteration programs requires that they be tested on the radiation image recording and reproducing systems in the medical facilities for program validation. However, a long time cannot be consumed for program testing since the systems are on duty in the user's places. If a function alteration program is found defective, then it is time-consuming to remove the defective part from the program, resulting sometimes in a system shutdown.

When another function is to be added to the radiation image recording and reproducing system, a new program regarding the other function is added to the existing program for controlling the system. Depending on the scale of the added program, however, the CPU of the system may be subjected to an increased load, and image processing, for example, may need a long period of time.

SUMMARY OF THE INVENTION

It is a major object of the present invention to provide a support device for use with a radiation image information processing system, which support device can quickly effect fault removal, function alterations, function additions, or the like in the system, so that the system can smoothly and efficiently be operated.

Another object of the present invention is to provide a support device for use with a radiation image information processing system which processes a radiation-transmission image into an image signal and generates a visible image from the image signal, the radiation image information processing system having a control device including a CPU, the support device comprising program executing information storing means for successively storing addresses and instructions hereof which are executed by the CPU of the control device, fault detecting means for detecting a fault of the radiation image information processing system and generating a fault detection signal indicative of the fault, and storage instructing means for instructing the program executing information storing means to store an address and an instruction thereof in response to the fault detection signal from the fault detecting means.

Still another object of the present invention is to provide the support device wherein the fault detecting means comprises fault address information establishing, means for establishing information including an address executed by the CPU when the fault occurs, fault address information storing means for storing the information established by the fault address information establishing means, and a comparator for successively comparing the addresses executed by the CPU with the address stored by the fault address information storing means thereby to detect the fault and generate the fault detecting signal.

Yet another object of the present invention is to provide the support device further including switching means for switching an image data processing program executed by the CPU of the control device to a recovery program in response to the fault detection signal from the fault detecting means.

A further object of the present invention is to provide a support device for use with a radiation image information processing system which processes a radiation-transmission image into an image signal and generates a visible image from the image signal, the radiation image information processing system having a control device including a CPU, the support device comprising address monitoring means for monitoring addresses in an image data processing program executed by the CPU of the control device, address information establishing means for establishing address information of one of the addresses, function alteration program storing means for storing a function alteration program which alters a function of the radiation image information processing system, comparing/detecting means for successively comparing the addresses monitored by the address monitoring means with the address information established by the address information establishing means, and for generating a detection signal when an address corresponding to the address information is detected, and means for executing the function alteration program stored by the function alteration program storing means in response to the detection signal.

A still further object of the present invention is to provide a support device for use with a radiation image information processing system which processes a radiation-transmission image into an image signal and generates a visible image from the image signal, the radiation image information processing system having a control device including a CPU, the support device comprising address information establishing means for establishing address information of one of addresses in an image data processing program executed by the CPU of the control device, function addition program storing means for storing a function addition program which adds a function to the radiation image information processing system, comparing/detecting means for successively comparing the addresses executed by the CPU with the address information established by the address information establishing means, and for generating a detection signal when an address corresponding to the address information is detected, and means for executing, parallel to each other, the image data processing program and the function addition program stored by the function addition program storing means in response to the detection signal.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
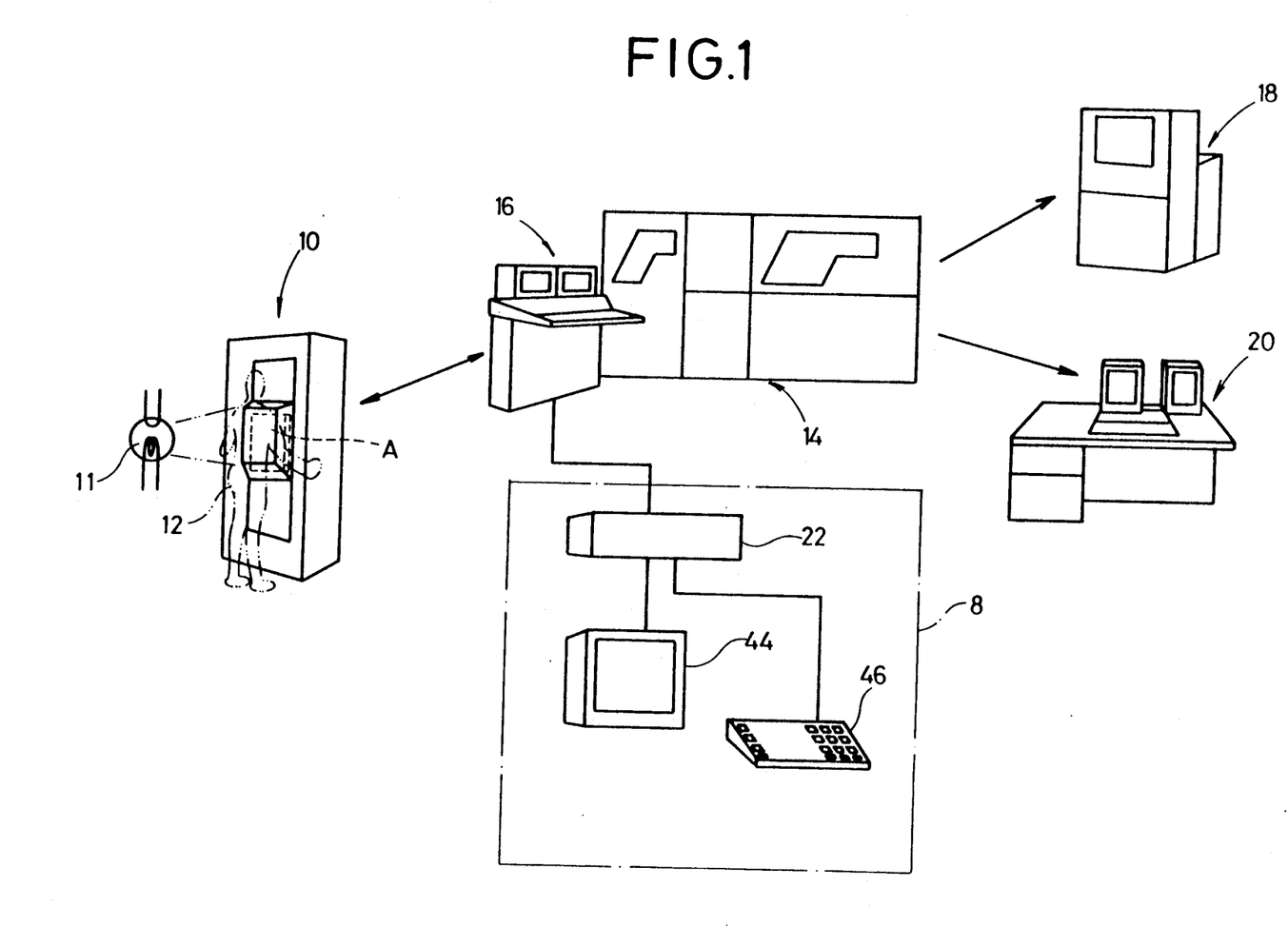
FIG. 1 is a schematic perspective view of a radiation image information processing system to which a support device according to the present invention is connected.

FIG. 1 shows a support device 8 according to the present invention which is connected to a radiation image information processing system. The radiation image information processing system basically comprises an image reading device 14 for photoelectrically reading, under certain conditions, a stimulable phosphor sheet A on which the X-ray transmitted image of an object 12 such as a human patient irradiated by an X-ray source 11 in an exposure device 10 is recorded, and for converting the read image into a digital signal, a control device 16 for controlling the operation of the image reading device 14 and processing the image, an image output device 18 for recording the image signal as a visible image on a photographic photosensitive medium such as a photographic film, and another image output device 20 for displaying the image signal as a visible image on a display screen.

The image reading device 14 comprises a mechanism for applying stimulating rays such as a laser beam to the stimulable phosphor sheet A and converting light emitted from the stimulable phosphor sheet A into an image signal with a photomultiplier, and also a mechanism for applying erasing light to the stimulable phosphor sheet A from which the image signal has been read, thereby to erase any remaining image information from the stimulable phosphor sheet A so that the stimulable phosphor sheet A can be used again. The control device 16 serves to control a feed mechanism which feeds the stimulable phosphor sheet A in the image reading device 14, to control the reading operation of the photoelectric transducer in the image reading device 14, to effect an image processing process in which the exposure conditions are recognized and the image is subjected to gradation processing, frequency processing, etc., to check patient information against the image, to monitor and control the operation of the entire system, and to control interfaces between the image reading device 14 and the image output devices 18, 20. The image output device 18 irradiates a photographic film with a laser beam that is modulated by the image signal produced by the image reading device 14, and develops the image on the film into a visible image. The image output device 20 displays the image signal as a visible image on a CRT or the like.

Figure 2:
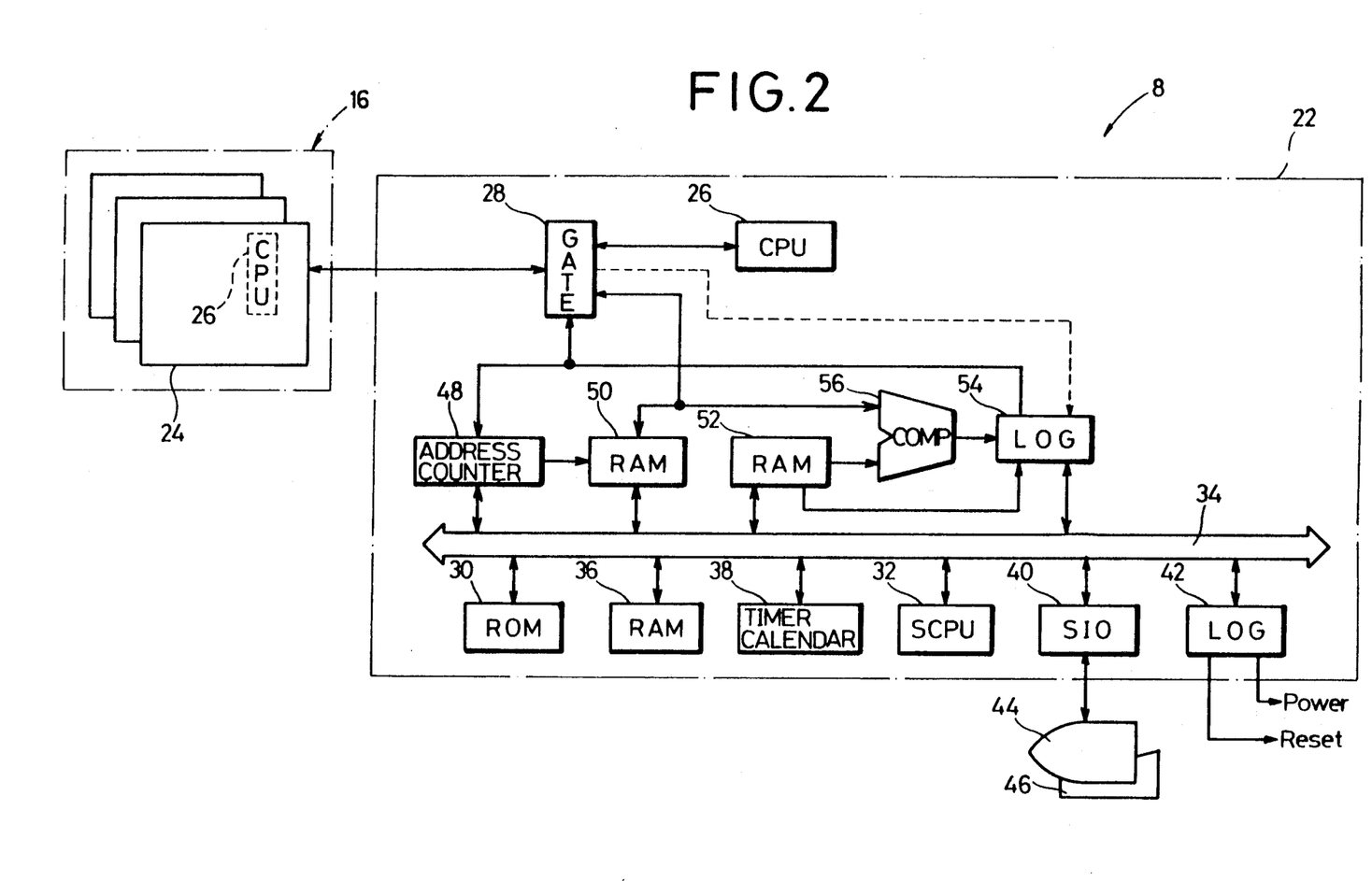
FIG. 2 is a block diagram of the support device shown in FIG. 1.

The support device 8 has a support control board 22 which is shown in FIG. 2. The support control board 22 is connected to a control board 24 in the control device 16 shown in FIG. 1. At this time, a CPU 26 for controlling the operation of the control device 16 is removed from the control board 24, and mounted on the support control board 22. The support control board 22 and the control board 24 are positioned closely to each other, and connected to each other by a flexible cable or the like through an IC socket of the CPU 26.

Supporting operation of the support control board 22 for supporting the control device 16 is controlled by a support CPU (hereinafter referred to as an "SPCU") 32 based on a support program stored in a ROM 30. The support control board 22 has a bus line 34 to which the ROM and the SPCU 32 are connected. The bus line 34 is also connected to a RAM 36 which stores data for recovery from faults, a function alteration program for altering functions of the control device 16, and a function addition program for adding functions, a time calendar 38, a serial input controller (SIO) 40, and a logic circuit 42. To the SIO 40, there are connected a display 44 for displaying an operating condition and a keyboard 46 for establishing and entering data. The logic circuit 42 is supplied with signals from a reset terminal and a power supply switch.

The bus line 34 is also connected to an address counter 48, a RAM 50 serving as a program executing information storing means for successively storing addresses and their instructions which are to be executed by the CPU 26, a RAM 52 for storing a certain address, and a logic circuit 54. The address counter 48 serves to address the RAM 50 based on commands from the SPCU 32 and the logic circuit 54. The RAM 50 serves to successively store addresses and their instructions, i.e., program executing information, which are supplied from the CPU 26 through a gate 28. The program executing information is also supplied through the gate 28 to a comparator 56. The RAM 52 serves to store an address from the CPU 26 which is indicative of a fault caused in the control device 16, and also to send the stored address to the comparator 56. The comparator 56 compares the addresses from the CPU 26 and the fault-indicating address from the RAM 52, and applies a signal representing the result of comparison to the logic circuit 54. When a function of the control device 16 is to be altered in the image data processing program, the RAM 52 also stores a particular address corresponding to an area where the function of the control device 16 is to be altered, and sends the particular address to the comparator 56. When a function is to be added to the control device 16 according to the image data processing program, the RAM 52 also stores a particular address corresponding to an area where the function is to be added to the control device 16, and sends the particular address to the comparator 56. Based on the result of the comparison in the comparator 56, the logic circuit 54 applies a shutdown command (WAIT signal) through the gate 28 to the CPU 26, and causes an interrupt in the SCPU 32.

Figure 3:
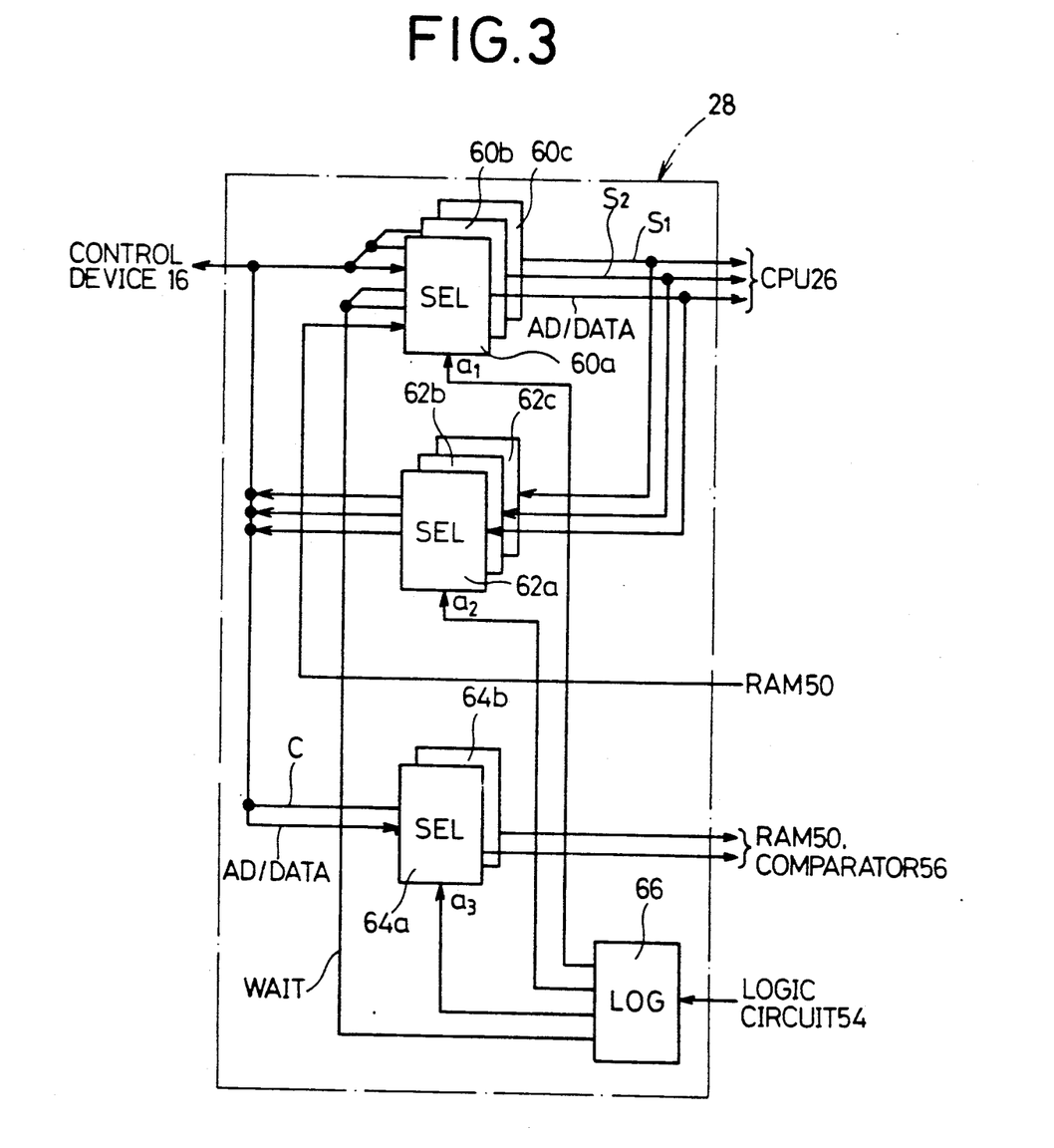
FIG. 3 is a block diagram of a gate in the support device shown in FIG. 2.

The gate 28 is of a structure as shown in FIG. 3. The gate 28 comprises selectors 60a through 60c, 62a through 62c, and 64a, 64b, each in the form of a multiplexer, and a logic circuit 66. The selectors 60a through 60c select either one of control signals $S_1$, $S_2$ and an address data signal AD/DATA from the control device 16 or the logic circuit 66 and the RAM 50 in response to a select signal $a_1$ from the logic circuit 66, and transfers the selected signal to the CPU 26. The selectors 62a through 62c select and transfer the control signals $S_1$, $S_2$ and the address data signal AD/DATA to the control device 16 in response to a select signal $a_2$ from the logic circuit 66. The selectors 64a, 64b select and transfer a control signal C and the address data signal AD/DATA from the control device 16 to the RAM 50 and the comparator 56 in response to a select signal $a_3$ from the logic circuit 66.

The support device 8 for the radiation image information processing system is basically constructed as described above. Now, operation of the support device 8 will be described below.

First, operation of the radiation image information processing system will be described. When an X-ray is applied to the object 12 by the X-ray source 11 in the exposure device 10, the X-ray passes through the object 12 and produces a transmitted-radiation image of the object 12 on the surface of the stimulable phosphor sheet A loaded in the exposure device 10. Then, the stimulable phosphor sheet A on which the object image is recorded is loaded into the image reading device 14, in which the recorded image is converted into image data in the form of an electric signal under the control of the control device 16.

More specifically, patient information, image processing conditions, and exposure conditions with respect to the stimulable phosphor sheet A are entered into the control device 16 through a console or the like. In the image reading device 14, a stimulating ray such as a laser beam is applied in a main scanning direction to the stimulable phosphor sheet A which is fed in an auxiliary scanning direction, light emitted from the stimulable phosphor sheet A in response to the applied stimulating laser beam is photoelectrically read by a photomultiplier or the like, and the signal is converted into image data in the form of a digital signal, all under the control of the control device 16. At this time, the stimulable phosphor sheet A is first roughly read to obtain preliminary image information based on which reading conditions are established, and then the stimulable phosphor sheet A is fully read under the reading conditions. Therefore, the image data can be accurately produced. After the image information has been read from the stimulable phosphor sheet A, the stimulable phosphor sheet A is irradiated over its entire surface by erasing light, so that the radiation image information is fully erased from the sheet A. Then, the stimulable phosphor sheet A can be used again for exposure in the exposure device 10.

The image data in the form of a digital data produced by the image reading device 14 are processed, if necessary, for gradation processing, frequency processing, or the like, by the control device 16. Thereafter, the image data are output to the image output device 18 or 20 or both for producing a visible image In the image output device 18, a laser beam which is modulated by the image data is applied in a main scanning direction to a photographic film that is fed in an auxiliary scanning direction, thereby recording the image on the photographic film. The image on the photographic film is then developed into a visible image. In the image output device 20, an object image based on the image data is displayed on a screen such as a CRT screen.

If a fault occurs in the radiation image information processing system while it is in operation, the system effects a certain error processing procedure, and is then brought into a HALT condition. For example, when the image data are subjected to frequency processing in the radiation image information processing system, the image data are divided by a certain coefficient. If no coefficient is established or the coefficient is zero, then the quotient becomes infinite. If such an error occurs, the system makes a jump from the normal image data processing program to a certain error processing address, saves the contents of a status register and a control register at the time the error occurs, and is brought into the HALT condition. Then, the user or operator of the system turns on the system for recovery from the error. If the system does not recover, then the user calls a serviceman.

The serviceman then connects the support device 8 to the control device 16 as shown in FIG. 1. More specifically, the serviceman removes the CPU 26 from the control board 24 of the control device 16, and mounts the CPU 26 on the support control board 22 of the support device 8 (see FIG. 2). Then, the serviceman connects the support control board 22 to the control board 24 with a flexible cable or the like through the gate 28.

Figure 4:
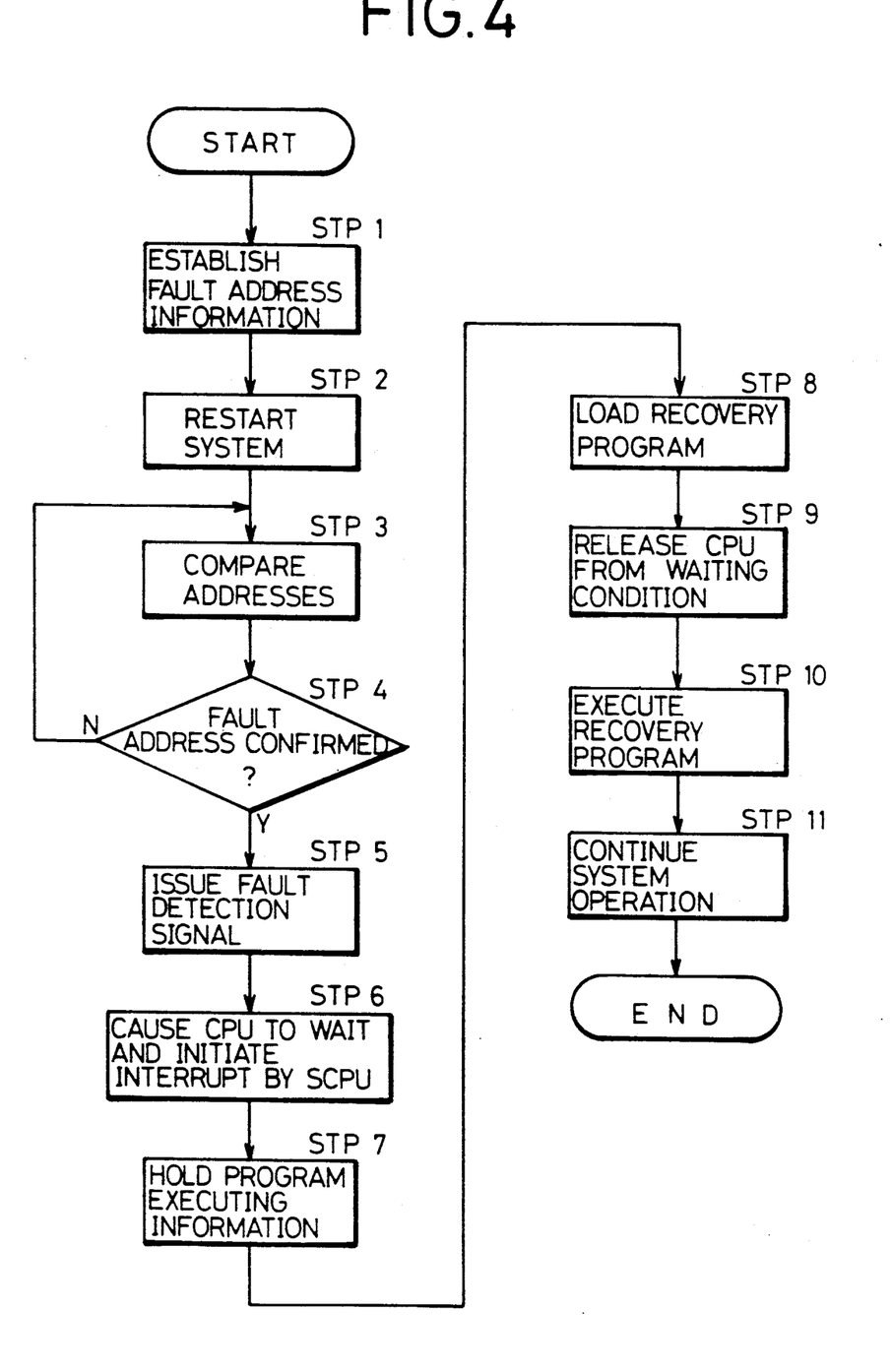
FIG. 4 is a flowchart of a processing sequence of the support device shown in FIG. 2.

Operation of the support device 8 in the event of an error will be described below with reference to FIGS. 2 and 3 and the flowchart shown in FIG. 4.

First, fault address information including an error processing address in the image data processing program at the time the error occurs is stored in the RAM 52 of the support control board 22. More specifically, in response to a command from the keyboard 46, the SCPU 32 of the support control board 22 loads the fault address information, which has been saved by the control device 16 when the error has occurred, through the selectors 64a, 64b of the gate 28 and the RAM 50 into the RAM 52 in a step 1.

After the fault address information has been stored in the RAM 52, the user restarts the system in a step 2 for the normal image data processing operation. At this time, the selectors 60a through 60c and 62a through 62c interconnect the control device 16 and the CPU 26 in response to select signals $a_1$, $a_2$ from the logic circuit 66. The selectors 64a, 64b connect the control device 16 and the CPU 26 to the RAM 50 and the comparator 56 in response to a select signal $a_3$ from the logic circuit 66.

The program executing information from the CPU 26 is transferred through the selectors 62a through 62c to the control device 16 which then controls the operation of the image reading device 14. The program executing information is also transferred through the selectors 62a through 62c and 64a, 64b to the RAM 50 and the comparator 56. The comparator 56 compares the program executing information with the fault address information stored in the RAM 52 in a step 3. The control device 16 transfers the control signals $S_1$, $S_2$ and the address data signal AD/DATA through the selectors 60a through 60c to the CPU 26. These signals are also transferred through the selectors 64a, 64b to the RAM 50 and the comparator 56. The comparator 56 also compares the program executing information from the control device 16 with the fault address information stored in the RAM 52 in the step 3.

At this time, the comparator 56 successively compares the addresses from the CPU 26 and the address data signal from the control device 16 with the fault address information stored in the RAM 52. If one of these signals coincides with the fault address information, or falls within a certain range of the fault address information, in a step 4, then the comparator 56 sends a fault detection signal to the logic circuit 54 in a step 5. The logic circuit 54 then applies a wainting signal WAIT to the CPU 26 through the gate 28, and causes the SCPU 32 to start an interrupt through the bus line 34 in a step 6. More specifically, the logic circuit 66 of the gate 28 supplies a select signal $a_1$ to switch over the selectors 60a through 50 to the CPU 26. The waiting signal WAIT from the logic circuit 54 is transferred through the selectors 60a through 60c to the CPU 26, which is held in a waiting condition. Based on an interrupt signal from the logic circuit 54, the SCPU 32 holds the program executing information from the CPU 26, which has been stored in the RAM 50, in a step 7. Then, the SCPU 32 writes a jump command for jumping to a particular address in the RAM 50, and also writes a recovery program to prevent the radiation image information processing system from being shut off in an address of the RAM 50 which is designated by the jump command, in a step 8. Then, the CPU 26 is released from the waiting condition through the logic circuit 54 in a step 9.

The CPU 26 executes the recovery program stored in the RAM 50 to enable the control device 16 to continue the image data processing operation in a step 10. More specifically, the CPU 26 executes the recovery program in the RAM 50 through the selectors 60a through 60c, and applies an operation command to the control device 16 through the selectors 62a through 62c. The control device 16 now continues the image data processing operation based on the recovery program stored in the RAM 50. When the image data processing operation based on the recovery program is over, the logic circuit 66 of the gate 28 supplies a select signal $a_1$ to switch over the selectors 60a through 60c for thereby connecting the control device 16 and the CPU 26 to each other. The operation of the radiation image information processing system is now continued according to the program of the system in a step 11.

The serviceman saves the trace of the data relative to the error, which are stored in the RAM 50, in a floppy disk or the like for finding out the cause of the fault or assisting in system recovery According to the recovery program stored in the RAM 50, the CPU 26 displays an error message on the console of the control device 16, thus indicating to the user that the error on the image should be removed.

In the above embodiment after the error area has been detected, the system is automatically recovered according to the recovery program. However, after the error area has been detected and analyzed, the system may be controlled to continue the normal image data processing operation according to a program which is corrected into a normal condition.

The error area is detected based on the fault address information stored in the RAM 52 in the illustrated embodiment. However, as indicated by the broken line in FIG. 2, the gate 28 and the logic circuit 54 may be connected to each other, and an error area may be detected by an error processing function of the CPU 26. More specifically, when the CPU 26 detects an error processing address, it applies a holdING signal HOLD through the logic circuit 54 to the SCPU 32, and the SCPU 32 stores error information in the RAM 50 in response to the holding signal HOLD. Based on the holding signal HOLD, the logic circuit 54 brings the CPU 26 into a waiting condition through the gate 28. Thereafter, the SCPU 32 effects the same operation as described above.

A function of the control device 16 can be altered by the support device 8 as follows:

A function alteration program is stored in the RAM 36 of the support control board 22, and address information for shifting the execution of the image data processing program to the SCPU 32 when the address as it is executed by the CPU 26 reaches a certain address is stored in the RAM 52.

Function alterations include, for example, altering the method of processing image data in the control device 16, altering the image data processing operation when an external memory such as an optical disk is connected to the image output device 20, and altering the image data processing operation when a plurality of radiation image processing systems are connected together.

As an example, an alteration of the method of processing image data in the control device 16 will be described below.

The CPU 26 executes the existing image data processing program until the image data processing is reached. As with the fault detecting process described above, the addresses and their instructions as they are executed by the CPU 26 are successively stored in the RAM 50 through the gate 28. When the address as it is executed by the CPU 26 has reached an image processing address, a particular address stored in the RAM 52 for shifting the execution of the image data processing program to the SCPU 32 coincides with the address stored in the RAM 50, as determined by the comparator 56. The comparator 56 now applies a coincidence signal to the logic circuit 54, which enables the gate 28 to connect the CPU 26 and the RAM 50. Then, the CPU 26 transfers data required for the SCPU 32 to effect image data processing from the control device 16 to the RAM 50. Thereafter, the CPU 26 is brought into a waiting condition in response to a waiting signal WAIT from the gate 28, and the SCPU 32 initiates an interrupt in response to an interrupt signal INT supplied from the logic circuit 54 through the bus line 34. In response to the interrupt signal INT, the SCPU 32 executes the function alteration program stored in the RAM 36. More specifically, the SCPU 32 starts an image data processing operation based on the function alteration program, and stores the processed image data in the RAM 50, after which control goes from the SCPU 32 to the CPU 26. The CPU 26 then transfers the processed data stored in the RAM 50 to the control device 16, and thereafter stores condition data of the control device 16 based on the processed data in the RAM 50. The above operation is repeated to carry out the process according to the function alteration program. When the image data processing operation according to the function alteration program is finished, the SCPU 32 establishes a certain address with respect to the register in the CPU 26, and also enables the gate 28 to connect the control device 16 and the CPU 26 to each other. The CPU 26 continues operation after the image data processing operation according to the address established by the SCPU 32. If the function alteration program has an error, then a flag is set in the SCPU 32, control is returned to the CPU 26, and the execution of the program by the SCPU 32 is stopped.

A function can be added to the control device 16 by the support device 8 as follows:

A function addition program is stored in the RAM 36 of the support control board 22, and address information for shifting the execution of the image data processing program to the SCPU 32 when the address as it is executed by the CPU 26 reaches a certain address is stored in the RAM 52.

As an example, an added function for parallel processing of a plurality of pieces of image information will be described below. For such parallel processing, information including particular address data for controlling the processing operation of the CPU 26 and the SCPU 32 is stored in the RAM 52, and information for the parallel processing of the CPU 26 and the SCPU 32 is stored in the RAM 50.

The CPU 26 executes the existing processing program until its area for image data processing is reached. As with the fault detecting process described above, the addresses and their instructions as they are executed by the CPU 26 are successively stored in the RAM 50 through the gate 28. When the address as it is executed by the CPU 26 has reached an image processing address, the particular address stored in the RAM 52 coincides with the address stored in the RAM 50, as determined by the comparator 56.

The comparator 56 now applies a coincidence signal to the logic circuit 54, which enables the gate 28 to connect the CPU 26 and the RAM 50. Then, the CPU 26 transfers data required for the SCPU 32 to effect image data processing from the control device 16 to the RAM 50 according to the processing procedure stored in the RAM 50. After the data transfer is completed, the SCPU 32 initiates an interrupt in response to an interrupt signal INT supplied from the logic circuit 54 through the bus line 34. In response to the interrupt signal INT, the SCPU 32 executes the function addition program stored in the RAM 36. More specifically, the SCPU 32 starts an image data processing operation based on the function addition program, and stores the processed image data in the RAM 50. During this time, the CPU 26 processes the other image information according to the image processing program in the control device 16. The parallel processing of plural pieces of image information is thus carried out. When the comparator 56 detects the particular address in the RAM 52 again, the CPU 26 reads the image data processed by the function addition program and stored in the RAM 50, transfers the processed image data to the control device 16, and then control goes to next image data processing operation in the control device 16.

The support device 8 may be connected to any of other devices than the control device 16, such as the image reading device 14, the image output device 18, or the image output device 20.

With the present invention, as described above, the control device of the radiation image information processing system is connected to the support device which can detect a fault and holds program executing information that leads to the fault. Since the program executing information at the time the fault occurs is held by the support device, the fault can be analyzed and the system can be recovered efficiently using the program executing information which has been held.

Moreover, the support device connected to the control device of the radiation image information processing system can hold particular address data and store a function alteration program. The radiation image information processing system can easily control a different mode of operation according to the function alteration program stored in the support device. Even if the function alteration program contains an error, the error can easily be checked without affecting the operation of the radiation image information processing system.

Furthermore, the support device connected to the control device of the radiation image information processing system can hold particular address data and store a function addition program. The radiation image information processing system can easily effect parallel image data processing operation according to the existing image data processing program and the function addition program, so that the desired image data can efficiently be processed.

Although a certain preferred embodiment has been shown and described, it should be understood that many changes and modifications may be made therein without departing from the scope of the appended claims.

What is claimed is:

1. A support device for use with a radiation image information processing system which processes a radiation-transmission image into an image signal and generates a visible image from the image signal, the radiation image information processing system having a control device including a CPU, said support device comprising:

program executing information storing means for successively storing addresses and instructions from said control device, which are executed by the CPU in the support device,;

fault detecting means for detecting a fault of the radiation image information processing system and generating a fault detection signal indicative of the fault;

storage instructing means for instructing said program executing information storing means to store an address and an instruction thereof in response to the fault detection signal from said fault detecting means.

said stored address and instruction corresponding to the address and instruction executed by the CPU at the time a fault occurs, thereby recording contents of a status register and control registers of the CPU at the time of fault and storing chronological data regarding the system failure,     said support device being arranged physically separate and detachable from the image processing system; and gate means for controlling which instructions said CPU executes, wherein said gate means switches the instructions executed by the CPU from an image data processing program stored in said control device to a recovery program stored in said program executing information storing means, when a fault is detected, and allows image processing operations to continue based upon said recovery program.

2. A support device according to claim 1, wherein said fault detecting means comprises fault address information establishing means for establishing information including an address executed by the CPU when the fault occurs, fault address information storing means for storing the information established by said fault address information establishing means, and a comparator for successively comparing the addresses executed by the CPU with the address stored by said fault address information storing means thereby to detect the fault and generate the fault detecting signal.

3. A support device for use with a radiation image information processing system which processes a radiation-transmission image into an image signal and generates a visible image from the image signal, the radiation image information processing system having a control device including a CPU, said support device comprising:

address monitoring means for monitoring addresses in an image data processing program executed by the CPU and for storing addresses and instructions executed by the CPU in memory of the support device,     address information establishing means for establishing address information of one of said monitored addresses;

function alteration program storing means for storing a function alteration program which alters a predetermined function performed by the radiation image information processing system;

comparing/detecting means for successively comparing the addresses monitored by said address monitoring means with the address information established by said address information establishing means, and for generating a detection signal when an address corresponding to the address information is detected; and     means for executing said function alteration program in response to said detection signal, wherein a support CPU of said support device performs an alteration upon said predetermined function before said function performs operations on the image, said CPU of said control device transferring image data, required by said support CPU for said alteration, to memory of the support device     said support device being arranged physically separate and detachable from the image processing system.

4. A support device for use with a radiation image information processing system which processes a radiation-transmission image into an image signal and generates a visible image from the image signal, the radiation image information processing system having a control device including a CPU, said support device comprising:

address information establishing means for establishing address information within an image data processing program executed by the CPU of the control device;

function addition program storing means for storing a function addition program which adds a function to the radiation image information processing system wherein a support CPU performs operations of said added function upon said image data in addition to operations performed by the CPU of said control device,     comparing/detecting means for successively comparing the addresses executed by the control device CPU with the address information established by said address information establishing means, and for generating a detection signal when a CPU executed address corresponding to the address information is detected; and     means for executing, parallel to each other, said image data processing program by said CPU and said function addition program by said support CPU in response to said detection signal,     wherein said support device allows parallel processing upon the image data by the CPU and support CPU,     said support device being arranged physically separate and detachable from the image processing system.

5. A support device according to claim 1, wherein said CPU is removed from the control device and mounted in the support device while performing fault detection operations.

6. A support device according to claim 3, wherein said CPU is removed from the control device and mounted in the support device while performing alternative function operations.

7. A support device according to claim 4, wherein said CPU is removed from the control device and mounted in the support device while performing additional function operations.

* * * * *